United States Patent
Soyak et al.

(10) Patent No.: US 10,993,222 B2
(45) Date of Patent: Apr. 27, 2021

(54) FLOATING LINKS

(71) Applicant: Airties Kablosuz Iletisim San. Ve Dis Tic. A.S., Instanbul (TR)

(72) Inventors: Eren Soyak, Istanbul (TR); Firat Birlik, Istanbul (TR); Okan Palaz, Istanbul (TR); Irfan Acar, Istanbul (TR)

(73) Assignee: AIRTIES KABLOSUZ ILETISIM SAN. VE DIS TIC. A.S., Istanbul (TR)

( * ) Notice: Subject to any disclaimer, the term of this patent is extended or adjusted under 35 U.S.C. 154(b) by 44 days.

(21) Appl. No.: 16/240,103

(22) Filed: Jan. 4, 2019

(65) Prior Publication Data

US 2019/0141701 A1 May 9, 2019

Related U.S. Application Data

(63) Continuation of application No. 14/858,274, filed on Sep. 18, 2015, now Pat. No. 10,278,169, which is a
(Continued)

(30) Foreign Application Priority Data

Jan. 23, 2015 (GB) .................................... 1501142

(51) Int. Cl.
  *H04W 72/04* (2009.01)
  *H04W 16/10* (2009.01)
  (Continued)

(52) U.S. Cl.
  CPC ....... *H04W 72/0426* (2013.01); *H04W 16/10* (2013.01); *H04W 36/0055* (2013.01); *H04W 84/18* (2013.01)

(58) Field of Classification Search
  None
  See application file for complete search history.

(56) References Cited

U.S. PATENT DOCUMENTS

| | | | |
|---|---|---|---|
| 8,134,995 B2 * | 3/2012 | Duggi | H04L 45/18 370/310 |
| 8,223,721 B2 * | 7/2012 | Berglund | H04W 36/0055 370/332 |

(Continued)

FOREIGN PATENT DOCUMENTS

| | | |
|---|---|---|
| EP | 2034786 A1 | 3/2009 |
| EP | 2232915 A1 | 9/2010 |

(Continued)

OTHER PUBLICATIONS

GB Intellectual Property Office Action dated Jun. 30, 2015 for Application No. GB1501142.2.
(Continued)

*Primary Examiner* — Robert M Morlan
(74) *Attorney, Agent, or Firm* — Harness, Dickey & Pierce, P.L.C.

(57) ABSTRACT

An access point including a memory; at least one network interface configured to interface over a network with one or more of a other access point and a user equipment (UE); and a processor configured to, establish, via the at least one interface, a virtual link with the UE based on the respective one of the at least one virtual address, and transfer the virtual link to the other access by transmitting a command to the other AP to set, after a time period, at least one network interface associated therewith to be addressable via the respective one of the at least one virtual address, and disassociating the at least one network interface and the respective one of at least one virtual address after the time period.

14 Claims, 6 Drawing Sheets

Related U.S. Application Data continuation-in-part of application No. 14/166,040, filed on Jan. 28, 2014, now Pat. No. 9,432,990.

(60) Provisional application No. 62/052,105, filed on Sep. 18, 2014, provisional application No. 61/931,277, filed on Jan. 24, 2014, provisional application No. 61/881,294, filed on Sep. 23, 2013, provisional application No. 61/869,110, filed on Aug. 23, 2013.

(51) Int. Cl.
*H04W 36/00* (2009.01)
*H04W 84/18* (2009.01)

(56) References Cited

U.S. PATENT DOCUMENTS

| | | |
|---|---|---|
| 2002/0167965 A1 | 11/2002 | Beasley et al. |
| 2006/0029021 A1 | 2/2006 | Sakawa et al. |
| 2006/0234701 A1 | 10/2006 | Wang et al. |
| 2008/0320108 A1 | 12/2008 | Murty et al. |
| 2009/0141685 A1 | 6/2009 | Berglund |
| 2010/0034148 A1 | 2/2010 | Zhang et al. |
| 2012/0144462 A1 | 6/2012 | Pochop, Jr. |
| 2013/0065633 A1 | 3/2013 | Sridhara et al. |
| 2013/0089092 A1 | 4/2013 | Dai et al. |
| 2014/0044097 A1 | 2/2014 | Chen et al. |
| 2014/0362776 A1* | 12/2014 | Tian ............... H04W 48/20 370/329 |

FOREIGN PATENT DOCUMENTS

| | | |
|---|---|---|
| EP | 2265056 A1 | 12/2010 |
| JP | 2006/135881 A | 5/2006 |
| WO | WO-2006/138122 A2 | 12/2006 |
| WO | WO-2009073529 A1 | 6/2009 |
| WO | WO-2014126445 A1 | 8/2014 |

OTHER PUBLICATIONS

Examination Report issued by the GB Intellectual Property Office dated May 11, 2017 in Application No. GB1501142.2.

Examination Report issued by the GB Intellectual Property Office dated Apr. 6, 2018 in Application No. GB1501142.2.

Examination Report issued by the GB Intellectual Property Office dated Sep. 12, 2018 in Application No. GB1501142.2.

PCT International Preliminary Report on Patentability dated Mar. 21, 2017 for PCT/EP2015/071515.

PCT International Search Report dated Feb. 5, 2016 for International Application No. PCT/EP2015/071515.

* cited by examiner

Route Discovery

FLOATING LINKS

PRIORITY INFORMATION

This application is a continuation application of U.S. application Ser. No. 14/858,274, filed on Sep. 18, 2015, which is a continuation-in-part of and claims priority from U.S. application Ser. No. 14/166,040 filed Jan. 28, 2014, which claims priority from U.S. Provisional Application Nos. 61/869,110 filed Aug. 23, 2013, 61/881,294 filed Sep. 23, 2013 and 61/931,277 filed Jan. 24, 2014, and also claims priority to U.S. Provisional Application No. 62/052,105 filed Sep. 18, 2014, and GB Application 1501142.2 filed on Jan. 23, 2015, the contents of each of which are incorporated herein by reference in their entirety.

BACKGROUND

An access point (AP) may provide networking capabilities to user equipment (UEs) connected thereto. The use of wireless devices in commercial and residential environments is rapidly increasing and, accordingly, there is increased consumer expectation that communication using such wireless devices is of high, un-interrupted, quality. Due to the wireless nature of the devices, which are commonly portable, there may be a desire to have such communication ideally seamless as the wireless devices are moved within a particular environment, such as residential building or an office. For example, in a residential dwelling, a tablet device might be moved from a room close to an access point on the ground floor, to a room upstairs in the residential dwelling, remote from the access point to a wireless network. To increase the coverage area provided to the UEs, a plurality of APs may be linked together to form a local access network (LAN) such that different ones of the APs service different areas to extend the coverage area of the network. The plurality of APs may be connected using various network topologies. These topologies may be divided into infrastructure networks and ad-hoc networks. In ad-hoc networks, the APs may not be supported by centralized infrastructure, but rather communicate directly with other APs in the network.

Mesh networks are a type of ad-hoc network topology in which the APs cooperate to distribute data within the network. The data may be distributed from a source AP to a destination AP using routing techniques which propagate the data along a path by hopping from node-to-node until the destination is reached. A source UE, wishing to send data to a destination UE, may send the data to its associated source AP and the data may propagate over the mesh network between interfaces that interconnect various APs between the source AP and a destination AP associated with the destination UE.

A problem may arise from the use of a wireless network system is that, when a wireless network client device associates with a particular access point, and then is subsequently moved within the network environment, the signal strength between the client device and associated access point may decrease, thereby affecting connectivity and data transmission. Such a decrease in signal strength may be particularly noticeable in systems employing relatively short range communication techniques, such as WiFi® or Bluetooth®.

Additionally, a single poor link may result in overall decreased capacity of the network. To address the problem of a client device remaining linked to a particular AP, the wireless connection of the client device may be temporarily turned off and then turned back on when the client device is in the new location. This commonly results in the client device scanning and selecting the most appropriate access point with which it should connect, based on its location. Alternatively, manual selection of the appropriate link may be made from a list of available options using the client device. This operation may also be performed automatically, for example the client device may be configured to roam for, and connect to, the best immediate connection, for example the access point with which it most strongly associates, and therefore with which it has the highest immediate data rate connection. However, the act of roaming to switch between different access points causes interruptions to the connectivity. Further, the highest immediate data rate connection may be a strong link in an otherwise weak chain and therefore by connecting with the most immediately strong link does not guarantee that overall end-to-end connectivity is improved between end points of data transfer.

Therefore, the quality of the data transmission in a wireless network may not be as high as expected since the user of the device may not perform the manual operation when needed and/or may select a less than optimal pathway.

SUMMARY

At least some example embodiments relate to an access point (AP).

In some example embodiments, the AP includes a memory configured to store at least virtual address therein; at least one network interface configured to interface with one or more of a other access point and a user equipment (UE), a respective one of the at least one network interface being addressable by the UE via a respective one of the at least one virtual address; and a processor configured to, establish, via the at least one interface, a virtual link with the UE based on the respective one of the at least one virtual address, and transfer the virtual link to the other access point by, transmitting, via the at least one network interface, a command to the other AP to set, after a time period, at least one network interface associated therewith to be addressable via the respective one of the at least one virtual address, and disassociating the at least one network interface and the respective one of at least one virtual address after the time period.

In some example embodiments, the processor is configured to determine the time interval based on a number of queued packets at the AP that are queued for transmission to the UE.

In some example embodiments, the processor is configured to transmit, via one or more of the at least one interface, a notification to the other AP network device after the number of queued packets have been depleted.

In some example embodiments, the processor is configured to transmit, via one or more of the at least one network interface, an indication to the other AP, the indication including information indicating the AP is using one of the at least one virtual address to identify the respective one of the at least one network interface to the UE.

In some example embodiments, the indication instructs the other AP that the respective one of the at least one virtual address is unavailable for use by the other AP.

In some example embodiments, the processor is configured to, estimate a current capacity of the virtual link from the AP to the UE and a potential capacity of the virtual link from the other AP to the UE; and determine whether to transfer the virtual link to other AP based on the current capacity and the potential capacity.

In some example embodiments, the processor is configured to estimate the current capacity and the potential capacity based on one or more of a received signal strength indication (RSSI), a signal to noise ratio (SINR), a number of hops to the UE, and an aggregate end-to-end throughput.

In some example embodiments, the at least virtual address are virtual media access control (vMAC) addresses.

In some example embodiments, the command contains an encryption cypher or a last known link adaptation state.

At least some other example embodiments also relate to an access point (AP).

In some example embodiments, the AP includes a memory configured to store at least virtual address therein; at least one network interface configured to interface with one or more of a other access point and a user equipment (UE), a respective one of the at least one network interface being addressable by the UE via a respective one of the at least one virtual address; and a processor configured to, receive, via the at least one network interface, a command from the other AP, the command instructing the AP to set the wireless network device to transfer a virtual link to the UE from other AP to the UE; assign a respective one of the at least one network interfaces to a respective one of the at least one virtual address associated with the virtual link, and communicate, via the respective one of the at least one network interfaces, with the UE after a time period such that the UE utilizes the virtual address to communicate with the AP.

In some example embodiments, the time interval is based on a number of queued packets at the other AP that are queued for transmission to the UE.

In some example embodiments, the processor is configured to receive, via one or more of the at least one interface, a notification from the other AP network device after the number of queued packets have been depleted.

In some example embodiments, the processor is configured to transmit, via one or more of the at least one network interface, an indication to the other AP, the indication including information indicating the AP is using one of the at least one virtual address to identify the respective one of the at least one network interface to the UE.

In some example embodiments, the indication instructs the other AP that the respective one of the at least one virtual address is unavailable for use by the other AP.

In some example embodiments, the at least virtual address are virtual media access control (vMAC) addresses.

In some example embodiments, the command contains an encryption cypher or the last known link adaptation state.

In some example embodiments, the processor is configured to, estimate a current capacity of the virtual link from the AP to the UE and a potential capacity of the virtual link from the other AP to the UE; and determine whether to transfer the virtual link to other AP based on the current capacity and the potential capacity.

In some example embodiments, the processor is configured to transfer the virtual link to the other AP by, transmitting, via the at least one network interface, the command to the other AP to set, after a time period, at least one network interface associated therewith to be addressable via the respective one of the at least one virtual address, and disassociating the at least one network interface and the respective one of at least one virtual address after the time period.

In some example embodiments, the processor is configured to estimate the current capacity and the potential capacity based on one or more of a received signal strength indication (RSSI), a signal to noise ratio (SINR), a number of hops to the UE, and an aggregate end-to-end throughput.

In some example embodiment, the AP and the other AP are connected to a Hybrid Mesh (HyMn) Network.

In at least one example embodiment, the at least interface includes at least two interfaces configured to interface to the other AP over a link layer therein using heterogeneous backhaul access technologies; and the processor is configured to determine a next-hop interface from the at least two interfaces and a next-hop access point to utilize when routing data from a source to a destination.

In at least one example embodiment, each of the at least two interfaces has a real Media Access Control (MAC) address associated therewith, and the processor is configured to route the data to the real MAC address associated with the next-hop interface.

In at least one example embodiment, the at least one virtual address includes at least two virtual addresses, and each of the at least two interfaces also has a respective one of the at least two virtual addresses associated therewith, and the UE is configured to transmit the data to a destination via one or more of the virtual addresses associated with respective ones of the at least two interfaces of the AP.

In at least one example embodiment, the processor is configured to determine the next-hop interface and the next-hop access point to utilize based on a forwarding table stored within the memory of the AP.

In at least one example embodiment, the processor is configured to determine the next hop interface and the next-hop access point by, performing a route discovery if the forwarding table does not contain an unexpired entry for the destination therein, determining the next-hop interface and the next-hop access point from the at least two interfaces and other access points, respectively, using an updated forwarding table received in response to the route discovery; and forwarding the data to the next-hop access point over the next hop-interface having a lowest aggregate cost from the UE to the destination as indicated by the forwarding table.

In at least one example embodiment, the processor is configured to perform the route discovery by, propagating a route request message downstream to the destination such that the route request message includes an estimate of the cost associated with interfaces chosen by each prior access point upstream in a route between the UE and the AP; updating, in the forwarding table, the aggregate cost associated with transmitting data from the AP to the destination based on a route reply message from the destination received in response to the route request message; and propagating the route reply message further upstream to another AP, if the AP is not the source.

In at least one embodiment, the backhaul access technologies that are heterogeneously utilized by the at least two interfaces allow the AP to select different collision domains to transmit the data therethrough.

In at least one embodiment, the collision domains include two or more of a wireless medium, an Ethernet cable, a Coaxial cable and a power line carrying alternating current thereon.

In at least one embodiment, the machine executable code, when executed by the processor, causes the processor to forward the data to the next-hop access point over the next-hop interface without resolving an internet protocol (IP) layer 3 address associated therewith.

At least some other example embodiments relate to a method of communicating using an access point having a memory configured to store at least virtual address therein; at least one network interface configured to interface with one or more of a other access point and a user equipment (UE), a respective one of the at least one network interface being addressable by the UE via a respective one of the at least one virtual address; and a processor.

In some example embodiments, the method includes establishing, via the at least one interface, a virtual link with the UE based on the respective one of the at least one virtual address, and transferring the virtual link to the other access point by, transmitting, via the at least one network interface, a command to the other AP to set, after a time period, at least one network interface associated therewith to be addressable via the respective one of the at least one virtual address, and disassociating the at least one network interface and the respective one of at least one virtual address after the time period.

In other example embodiments, the method includes receiving, via the at least one network interface, a command from the other AP, the command instructing the AP to set the wireless network device to transfer a virtual link to the UE from other AP to the UE, assigning a respective one of the at least one network interfaces to a respective one of the at least one virtual address associated with the virtual link, and communicating, via the respective one of the at least one network interfaces, with the UE after a time period such that the UE utilizes the virtual address to communicate with the AP.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the embodiments.

DETAILED DESCRIPTION

Figure 1:
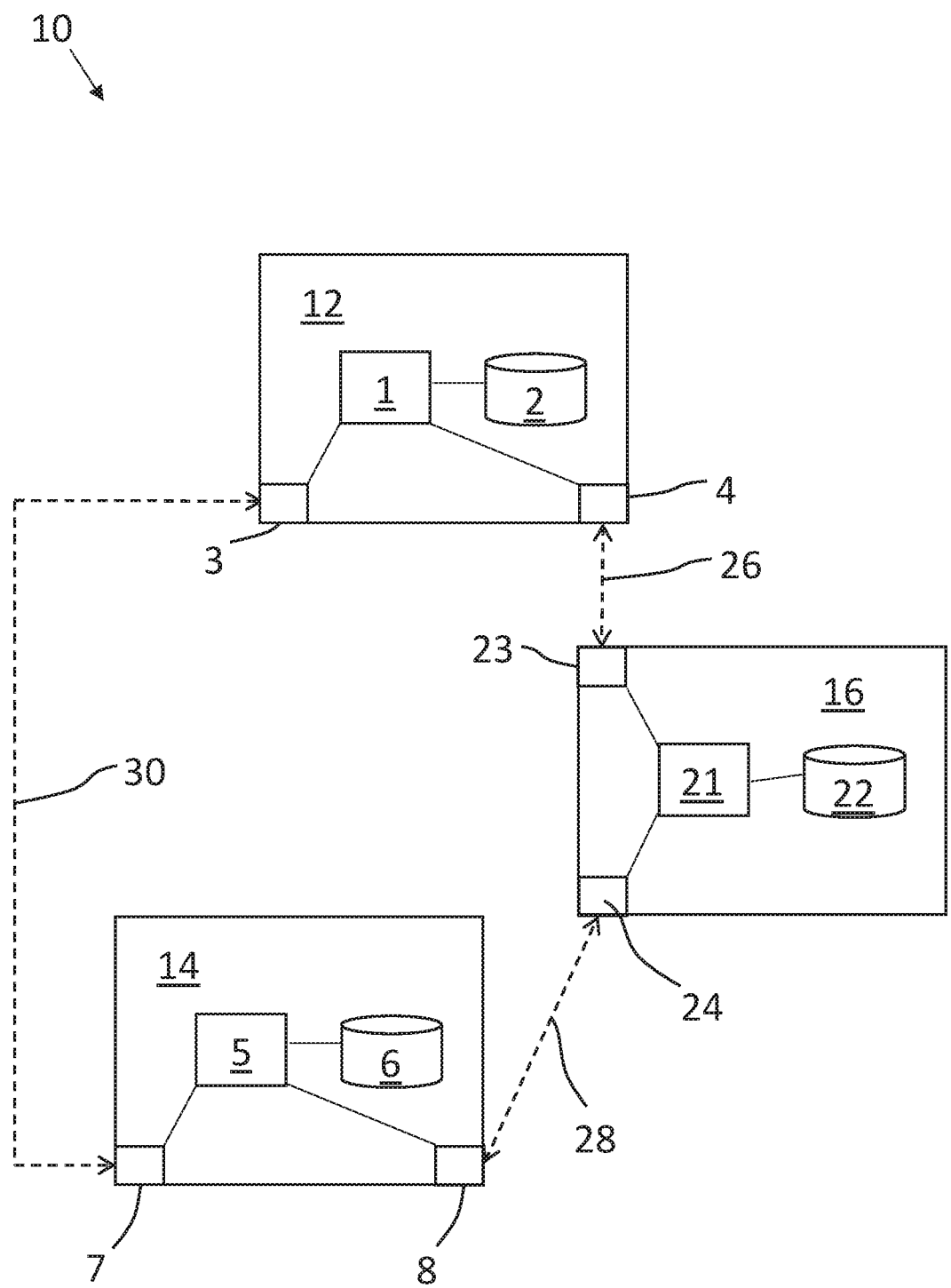
FIG. 1 is a schematic of linkable devices in a wireless network, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional operations not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. However, example embodiments are not limited to these given implementations.

As used herein, the term "user equipment" (UE) may be considered synonymous to, and may hereafter be occasionally referred to, as a phone, wirelessly equipped laptop, a mobile, mobile unit, mobile user, subscriber, user, remote station, access terminal, tablet, receiver, smart television, etc., and may describe a remote user of wired or wireless resources in a network. The term "Access Point" (AP) may be considered synonymous to and/or referred to as a wired and/or wireless router, hub, switch, a public gateway, a public/private gateway, and/or other source of audio and/or data transmission usable by various UEs and may describe equipment that provides data and/or audio connectivity between the network and one or more UEs.

FIG. 1 is a schematic of linked devices in a wireless network 10 according to example embodiments.

Referring to FIG. 1, the wireless network 10 may include a first access point (AP) 12, a second access point 14 and a client device (e.g., a user equipment UE) 16, which are all configurable to communicate with one another.

The first access point 12, the second access point 14 and the client device 16 are all wireless network devices. The first access point 12 may include a processor 1, a memory 2, and network interfaces 3, 4. The second access point 14 may include a processor 5, a memory 6, and network interfaces 7, 8. The client device 16 may include a processor 21, a memory 22, and network interfaces 23, 24.

The processors 1, 5, and 21 may include one or more general-purpose or special purpose computers, such as, but not limited to a controller, an arithmetic logic unit (ALU), a digital signal processor, a microcomputer, a field programmable gate array (FPGA), a programmable logic unit, a microprocessor or any other device capable of responding to and executing instructions in a defined manner. The processors 1, 5 and 21 may run an operating system (OS) and one or more software applications that run on the OS. The processors 1, 5 and 21 also may access, store, manipulate, process, and create data in response to execution of the software. For the sake of easy understanding, each of the processors 1, 5 and 21 have been described as a single processor; however, one skilled in the art will appreciate that each of the processors 1, 5 and 21 may include multiple processing elements and multiple types of processing elements. For example, each of the processors 1, 5 and 21 may include multiple processors or a processor and a controller. In addition, other processing configurations are possible, such as parallel processors.

The memories 2, 6 and 22 may be computer-readable mediums and may include permanent mass storage devices such as a random access memory (RAM), a read only memory (ROM), and a disc drive. The computer-readable medium may include a non-transitory computer-readable medium such as a floppy drive, a disc, a tape, a Digital Versatile Disc (DVD)/compact disc (CD)-ROM drive, and a memory card.

The memories 2, 6 and 22 may store program codes that, when executed by respective ones of the processors 1, 5 and 21, may configure the processors 1, 5 and 21 as special purpose computers configured to perform the functions described herein. For example, in some example embodiments, the program code may configure the processor 1 of the first AP 12 to establish, via at least one interface, a virtual link with the client device 16 based on a respective one of at least one virtual address, and transfer the virtual link to the second access point 14 by, transmitting, via the at least one network interface 3, 4, a command to the second access point 14 to set, after a time period, at least one network interface 7, 8 associated therewith to be addressable via the respective one of the at least one virtual address, and disassociating the at least one network interface 3, 4 and the respective one of at least one virtual address after the time period. In other example embodiments, the program code may configure the processor 5 of the second AP 14 to receive, via the at least one network interface 7, 8, a command from the first AP 12, the command instructing the second AP 14 to transfer a virtual link to the client device 16 from first AP 12 to the second AP 14, assign a respective one of the at least one network interfaces 7, 8 to a respective one of the at least one virtual address associated with the virtual link 28, and communicate, via the respective one of the at least one network interfaces 7, 8, with the client device 16 after a time period such that the client device 16 utilizes the virtual address to communicate with the second AP 14. Therefore the processors 1 and 4 may improve the functioning of a respective one of the APs 12, 14 itself by allowing the client device 16 to seamless transition between APs 12, 14 without having to reboot the wireless connection therebetween.

FIG. 1 depicts two network interfaces 3, 4 at the first access point 12, two network interfaces 7, 8 at the second access point 14 and two network interfaces 23, 24 at the client device 16. Different network interfaces allow the access points and client devices to operate using different communication methods, such as WiFi®, Bluetooth®, WiGig®, ZigBee® and LiFi®. Different communication methods can be used to communicate between access points and client devices For example, the first access point 12 may communicate with the client device 16 using WiFi, and may communicate with the second access point 14 using a different communication method, such as a wired method, for example using an Ethernet connection, or a different wireless method, for example, Bluetooth®. While FIG. 1 depicts two network interfaces 3, 4 at the first access point 12, two network interfaces 7, 8 at the second access point 14 and two network interfaces 23, 24 at the client device 16, in other examples, the first access point 12, the second access point 14 and the client device 16 have one or more network interfaces.

The first access point 12 may be in active communication with the client device 16. For example, the network interface 4 of the first access point 12 and the network interface 23 of the client device 16 may be connected via a floating link (FL) 26 to exchange data.

The first access point 12 and the client device 16 may establish the floating link (FL) 26 based on mutual identification of the client device 16 to the access point 12 and of the access point 12 to the client device 16. The mutual identification may be based on Media Access Control (MAC) addresses, and the first access point 12 and the client device 16 may transmit packets along the floating link 26 that each include the source and destination MAC addresses in its header.

For example, the first access point 12 may issue itself a virtual Media Access Control (vMAC) address to utilize rather than a conventional fixed MAC address. The first access point 12 may have a vMAC address assigned thereto for each client device 16 that interacts with the first access point 12. The vMAC addresses are unique to the local area network (LAN) in which the client device 16 and the first access point 12 are operating, but are not permanently linked to the first access point 12 that has issued them.

The first access point 12 may assign the vMAC address to identify itself to a client device 16 upon first interaction therewith. The first access point 12 may determine the vMAC address from one or more of the memory 2, or from a centralised database (described in relation to FIG. 5 below). In other example embodiments, the first access point 12 may generate the vMAC address based on a hash of the first access point's 12 real fixed MAC address. However, example embodiments are not limited thereto, for example, the first access point 12 may generate the vMAC address based on any system that provides a usable address that is unique within the network.

The processor 1 of first access point 12 monitors potentially superior pathways between other network devices and the client device 16. In the event that a superior pathway is identified, the first access point 12 may perform a handoff operation. In the handoff operation, the vMAC address that is used to identify the first access point 12 to the client device 16 may be passed to the superior access point via network interfaces 3, 7. The determination of superior pathways is detailed below with reference to FIG. 3.

For example, as illustrated in FIG. 1, the second access point 14 may a superior potential link with client device 16. The first access point 12 may pass the vMAC address of the first access point 12 in a command 30 to the second access point 14. The command 30 instructs the second access point 14 to store the vMAC address in the memory 6, and, to use the vMAC address to identify the second access point 12 to the client device 16.

When the second access point 14 receives the command 30, the second access point 12 may form a floating link 28 between the network interface 8 of the second access point 14 and the network interface 24 of the client device 16.

Therefore, in the wireless network 10, because the vMAC address can be passed from the first access point 12 to the second access point 14, the access point with which the client device 16 is communicating may change while the client device 16 is unaware of the change, and therefore, seamless use of the client device 16 over optimised channels may be achieved without having to reboot the wireless connection of the client device 16.

If the processor 1 of the first access point 12 determines that there is a superior pathway that is routed through the second access point 14, a handoff operation may be performed. As discussed below, the handoff operation may be performed in a single operation or a phased operation.

In the single operation, the first access point 12 may send the command packet 30 to the second access point 14. The command packet 30 may contain the vMAC address that the first access point 12 was using to identify itself to the client device 16 and instructions telling the second access point 14 to use the vMAC address to create the floating link 28 between the client device 16 and the second access point 14.

Upon receipt of the command packet 30 from the first access point 12, the second access point 14 may transmit data throughout the network, informing other network devices that it has assumed the vMAC address and is using it to communicate with the client device 16. The second access point 14 may broadcast the data or may unicast the data directly to specific access points or network nodes.

The second access point 14 uses the vMAC to communicate with the client device 16 whilst also monitoring for potentially superior routes of communication for the client device 16. In the event that a superior communication route is found with a different device, the vMAC is passed to that device, along with a command instructing the different device to use the vMAC to identify itself and communicate with the client device 16.

As discussed above, in some example embodiments, the wireless network devices 12, 14, 16 may identify themselves to one another using the vMAC address in order to enable communication. However, example embodiments are not limited thereto, and different types of virtual address may be used for the devices to identify one another. For example, in some example embodiments, virtual Bluetooth address (vB-D_ADDR) may be used in the same manner as a vMAC address. Similarly, in other example embodiments, similar mechanisms of virtual addresses may be used in the context of IEEE 802.15 (ZigBee), IEEE 802.11ad (WiGig) and Visible Light Communication (LiFi).

The first access point 12 may transmit the command 30 to the second access point 14 such that the command 30 contains the vMAC address so that the second access point 14 can seamlessly pick up communication with the client device 16. In some example embodiments, the first access point 12 may transmit the command 30 such that the command 30 also contains context information regarding the vMAC, such as the WPA2 encryption cypher and last known PHY link adaptation state.

When the client device 16 enters the mesh network that utilizes floating links and virtual address, the client device 16 may initially associate with a node, such as the first access point 12 or the second access point 14. The client device 16 may associate with the first physical network node encountered. For example, for a WiFi device this would be the first access point to which an Associate Request is sent. The node that receives the Associate Request may generate the virtual address for the floating link, and may, therefore, becomes the first Holder of the floating link.

In some example embodiments, each access point in the floating link network has a list of virtual addresses (for every available physical layer such as WiFi or Bluetooth) that can be generated by the access point. In other example embodiments, as described below with reference to FIG. 5, the virtual addresses may be drawn out of a central list. For example, when the client device 16 enters the network 10, the client device 16 may send an Associate Request to the first access point 12. The first access point 12 may generate, either from memory 2 or from a centralised database, a virtual address. The first access point 12 may use the virtual address to identify the first access point 12 to the client device 16, thereby allowing enabling communication over the floating link 26.

Once a client device disconnects from the network (which could be through an explicit control packet stating disassociation, or through a prolonged period of idleness or non-responsiveness), the current Holder for that floating link may transmit a disconnect message of this event throughout the network that contains the floating link address. When a network node receives the disconnect advertisement, the network node may check the floating link address against the list of virtual floating link addresses it has issued in the past, and, if the disconnected floating link is among them, the network node may free the entry for re-issuing. For example, with reference to FIG. 1, when the client device 16 exits the network 10, the first access point 12 may transmit a disconnect message to other nodes in the network, for example the second access point 14. The second access point 14 may check the floating link address against the list of virtual floating link addresses associated therewith, and, if the disconnected floating link is among them, the second access point 12 may free the entry for re-issuing. Therefore, in the event that the client device 16 re-enters the network, the virtual address that was used to connect the first access point 12 and the client device 16 is available for the second access point 14 to identify itself to the client device 16, if the re-entry dictates that forming that link 28 is preferable.

In other example embodiments, rather than performing the handoff operation in a single step, the first access point 12 may perform the handoff operation as a phased procedure, such that, packets that are queued at the first access point 12 may be transferred to the second access point 14.

Figure 2:
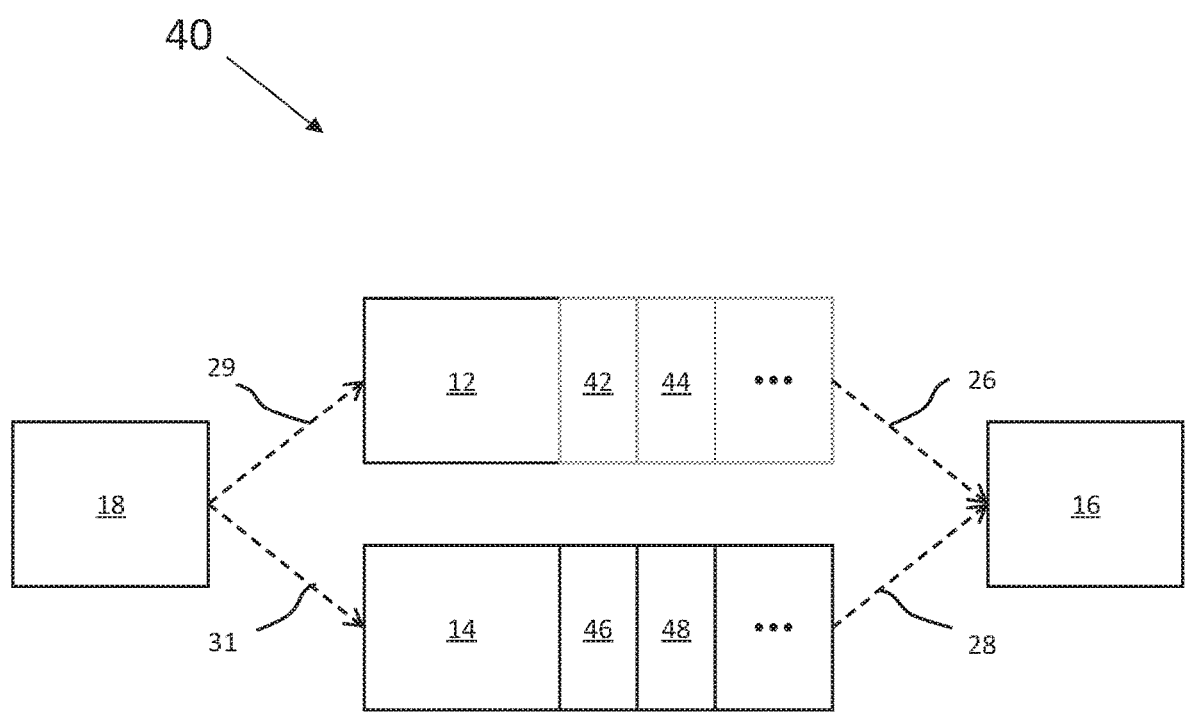
FIG. 2 is a schematic of linkable devices in a wireless network, in accordance with an example embodiment.

FIG. 2 is a schematic of an arrangement 40 showing the first access point 12, the second access point 14, the client device 16 and a third access point 18 according to example embodiments.

Referring to FIG. 2, data packets 42, 44 may be queued at the first access point 12 and data packets 46, 48 may be queued at the second access point 14.

Data may be initially routed from the third access point 18 to the client device 16 via the first access point 12. For example, as shown in FIG. 2, data packets 42, 44 may be sent from the third access point via link 29 to the first access point 12, where they are queued for further sending to the client device 16.

The first access point 12 establishes the floating link 26 with the client device 16 and identifies itself using a vMAC address. When the first access point 12 determines that communication from the third access point 18 to the client device 16 is superior when directed through the second access point 14, the first access point 12 may initiate a handoff from the first access point 12 to the second access point 14.

In a two phase handoff, the first access point 12 performs a first phase where the first access point 12 maintains the floating link 26 while sending a command 30 to the second access point 14 indicating that the handoff has been initiated. The first access point 12 continues to transmit queued data packets 42, 44, to the client device 16 using the floating link 26 based on the virtual address. Once the first access point 12 determines that the queue of data packets 42, 44 has been depleted and there are no more data packets to be sent from the first access point 12 to the client device 16, the second phase of the two phase handoff procedure commences and the second access point 14 starts to use the vMAC address to communicate with the client device over a floating link 28 using the vMAC address.

Once the second access point 14 is using the vMAC to communicate with the client device 16 over the floating link 28, it transmits data to other devices in the network, informing them that the second access point 14 is using the vMAC to communicate with the client device 16. At that point, the third access point 18 starts to send data packets 46, 48, to the client device 16 via the communication path 31 and the floating link 28.

In the period of time between the second access point 14 announcing to the network that it is communicating with the client device 16 and the queue of data packets 42, 44 being depleted from the first access point 12, data packets directed to the first access point 12 are either dropped or routed to the client device 16 via a different route. Depending on the data that is being routed through the system, the possibility of lost packets that are queued may not be significantly detrimental to the overall quality of the data consumed at the client device 16.

In other example embodiments, the handoff operation may be a three-phased operation. Data may be initially routed from the third access point 18 to the client device 16 via the first access point 12. For example, the third access point may send data packets 42, 44 via link 29 to the first access point 12, where they are queued for further sending to the client device 16. The first access point 12 establishes a floating link 26 with the client device 16 and identifies itself using a vMAC address. When the first access point 12 determines that communication from the third access point 18 to the client device 16 is superior when directed through the second access point 14, the first access point 12 may handoff the connection from the first access point 12 to the second access point 14.

In a three phase handoff, the first access point 12 performs a first phase where the first access point 12 maintains the floating link 26 but sends a command 30 to the second access point 14 indicating that the handoff has been initiated. The first access point 12 continues to transmit queued data packets 42, 44, to the client device 16 using the floating link 26 based on the virtual address. Meanwhile, the second access point 14 transmits data to other devices in the network, informing them that it is using the vMAC to communicate with the client device 16. At that point, the third access point 18 starts to send data packets 46, 48, to the client device 16 via the communication path 31 and the floating link 28. Once the second access point 14 has transmitted data to other devices in the network, informing them that it is using the vMAC to communicate with the client device 16, the second phase of the three-phase handoff commences and the second client device 14 sends a notification to the first access point 12, telling the first access point 12 that it has now notified the network of the change in present ownership of the vMAC address.

Once the first access point 12 determines that the queue of data packets 42, 44 has been depleted from the first access point 12 to the client device 16 and there are no more data packets to be sent from the first access point 12 to the client device 16, the third phase of the three-phase handoff commences. In to third phase, the first access point 12 sends a notification to the second access point 14 that indicates that the queue of data packets 42, 44 has been depleted. The second access point 14 then starts to transmit data packets 46, 48, which it has received and queued from the third access point 18, via floating link 28 to the client device 16. Advantageously, excess data packets sent to the first access point 12 once the second access point 14 has assumed the vMAC address and formed a floating link 28 with the client device 16 may not be lost.

In the period of time between the second access point 14 announcing to the network that it is communicating with the client device 16 and the queue of data packets 42, 44 being depleted from the first access point 12, data packets directed to the first access point 12 are either dropped or routed to the client device 16 via a different route.

The determination of whether there is a superior pathway through which data should be routed is now described with reference to FIG. 3.

Figure 3:
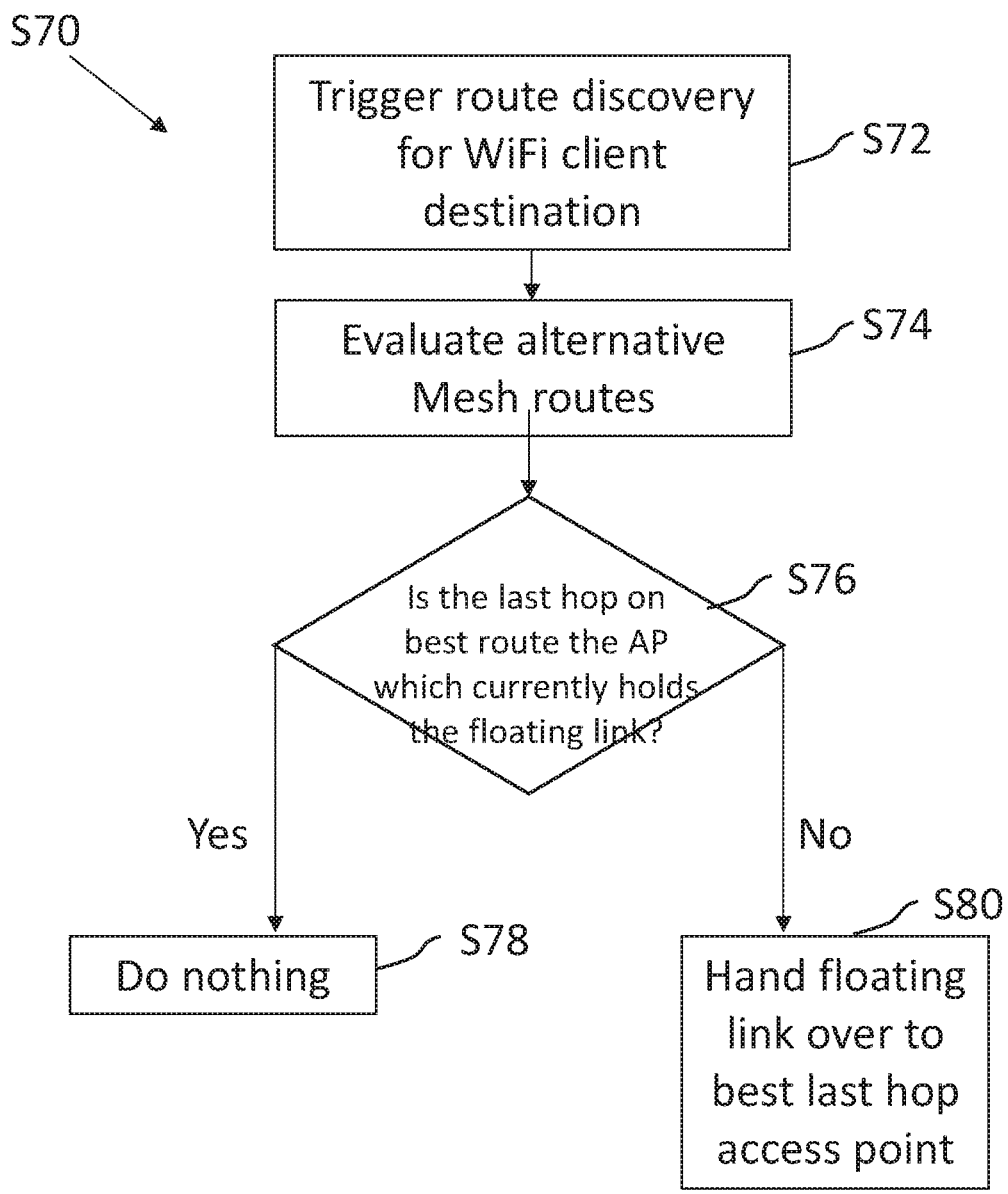
FIG. 3 is a flowchart of a method, in accordance with an example embodiment.

FIG. 3 is a flowchart of a method according to example embodiments.

Referring to FIG. 3, in operation S70, an access point, such as the first access point 12, or second access point 14, initiates a procedure to determine the desired communication pathway.

In operation S72, the access point starts route discovery for the WiFi client destination, such as the client device 16.

Route discovery is described in UK Patent Application. No. 1422183.2, titled: Systems and Methods for Selecting an Optimum Communication Route in a Wireless Network, the entire contents of which are incorporated herein by reference.

The first access point 12 may initially communicate with the client device 16 by identifying itself to the client device 16 using a virtual address. The first access point 12 uses a request/response mechanism to determine traffic through different pathways in a mesh network.

The first access point 12 may send a request, such as a Beacon Request Frame, to the client device 16 and to other nodes in the network, for example, the second access point 14 of FIG. 1. The second access point 14 also transmits requests to other nodes in the network. Each node in the network collects request frames and prepares and sends responses (such as Beacon Response Frames) to each of the request frames, containing information about the received request packets and corresponding data. This way, data, such as Received Signal Strength Indication (RSSI) values between different nodes are disseminated throughout the network, enabling determination of data throughputs in the network.

In operation S74, the first access point 12 has received information from the route discovery process, the processor 1 of the first access point 12 may evaluate potential mesh routes in the mesh network. The first access point 1 evaluates the end-to-end throughput through alternative mesh routes in the network. For example, the first access point 12 determines traffic throughput to and from the client device 16 via each of the first access point 12 and the second access point 14.

In operation S76, the first access point 12 determines if the last hop formed by a floating link from the current access point is the best route that can be established. Details on the route discovery operation are discussed below with reference to FIG. 4.

In operation S78 no action is taken, if in operation S76, the first access point 12 determines that the current route is the best route, (for example, if the connection between the first access point 12 and the client device 16 enables better data transfer than between the client device 16 and the second access point 14).

In operation S80 a handoff operation is performed to transfer information relating to the virtual address upon which the current floating link is based to the access point that does form the best last hop, i.e. the second access point 14, if in operation S76, the first access point 12 determines that the current route is not the best route (for example, if the connection between the first access point 12 and the client device 16 enables less data transfer than between the client device 16 and the second access point 14).

In some example embodiments, when performing route discovery, the access points may attempt to provide a client device with the strongest link to an access point. For example, in operation S76, the first access point 12 may determine that the best route on the last hop based on the Received Signal Strength Indication (RSSI) at the other access points in the network. To accomplish this, each access point may periodically broadcast a control packet to other associated mesh access points with a list of client devices it can hear and RSSI's associated with these client devices. This RSSI estimation can be done by an AP to which the client is not currently associated by observing the RSSI of broadcast packets, such as Probe Requests or Clear-To-Send (CTS) messages. This distinction may offset possible misleading effects of access point-client specific measures, such as beamforming. The RSSI is used to estimate potential link capacity between the estimating AP and client. While raw RSSI can be used directly to estimate this capacity, other factors, such as channel width (20/40/80/160 MHz), noise level, number of available transmit and receive chains etc. can be used to form a more accurate estimate of potential link capacity.

When an access point learns from another access point that one of its current client devices can establish a better link with that access point, it will perform a floating link FL handoff to that access point.

In another example embodiment, when performing route discovery, the access points may attempt to maintain the best end-to-end link for the client device. For example, in operation S76, the first access point 12 may determine the best end-to-end link as the link which minimizes the airtime spent by the client for its uplink and downlink traffic, including airtime spent by the network, such as a Hybrid Mesh (HyMn) network, in getting the traffic to the access point which holds the floating link for the client device. In this embodiment the access points still broadcast client device RSSI information as described above, but instead of choosing the best link based on RSSI, the first access point 76 determines whether to proceed to the handoff operation in operation S80 based on whether the current traffic pattern of the client device (all uplink and downlink activity to all traffic sources and sinks) would be minimized by handing the floating link off to another access point. The HyMN network may signify any mesh network where at least two APs are interconnected via at least two heterogeneous backhaul access technologies.

In another example embodiment, each access point is free to "commandeer" the floating link to the client device it wishes to transmit to directly. For example, both the first access point 12 and second access point 14 in FIG. 1 could, by turns, have traffic for the client device 16, as would be the case when the first access point 12 and the second access point 14 are connected to two different sources of traffic such as a Broadband Gateway and Satellite Set-Top Box. The primary distinction of this embodiment is the very small time scale for which the floating link is used by each access point, which may be as short as a single WiFi packet. For example, multiple access points, connected to each other by strong backbone connections, may maintain concurrent sessions to a relatively lower capacity client, such as a mobile tablet receiving Satellite video and supplementary information (such as subtitles or application data) from the Internet at the same time.

In some example embodiments, the first access point 12 may periodically perform operations S70 to S80. In other example embodiments, operation S70 is initiated by receipt at an access point of a packet with a MAC address that is not registered in a forwarding table of MAC addresses stored in the memory of the access point.

Figure 4:
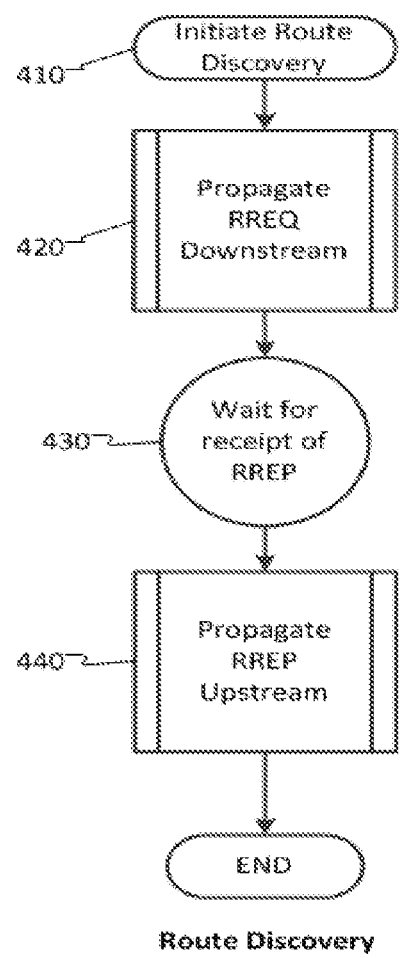
FIG. 4 illustrates an example of an Access Point (AP) performing a route discovery method using a forwarding table, in accordance with an example embodiment.

FIG. 4 illustrates an example of an Access Point (AP) performing a route discovery method using a forwarding table according to an example embodiment.

Referring to FIG. 4, as discussed above, the AP 12 may utilize a route discovery method to evaluate potential mesh routes in a mesh network. In some example embodiments, the route discovery may include Operations 5410 to 5440 discussed herein.

In operation S410 the AP 12 may initiate a route discovery method.

In operation S420, the AP 12 initiates a Propagate Route Request downstream procedure to propagate a Route Request message (RREQ) to each of its one-hop neighbors. The neighboring APs may create or update an entry in their Forwarding Table for a destination AP based on information in the RREQ message.

In operation S430, the AP 12 may wait for receipt of a Route Response message (RREP) generated by a destination in response to the Route Request message (RREP). Each one of the APs along the route from the source to the destination AP may complete their associated forwarding table in response to the RREP message.

In operation S440, in response to a received RREP message, the AP 12 may initiate a Propagate Route Response upstream procedure to propagate a Route Response message (RREP) back to a source AP 200. Each one of the APs along the route from the source to the destination AP may complete their associated forwarding table in response to the RREP message.

The processor 1 of the first access point 12 may evaluate potential mesh routes in the mesh network using information entered in the forwarding table therein during the route discovery process.

Figure 5:
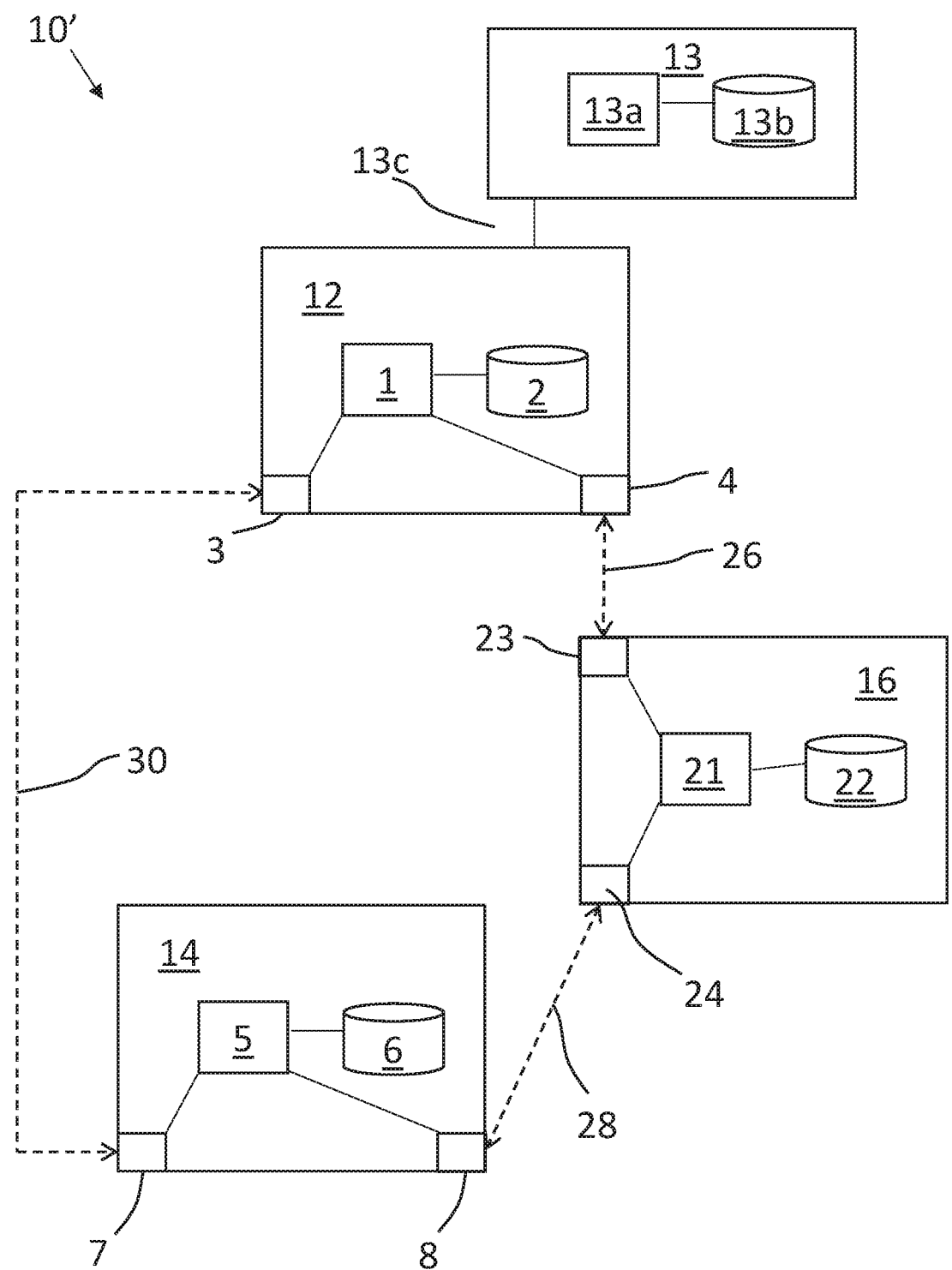
FIG. 5 is schematic of home network, in accordance with an example embodiment.

FIG. 5 is a schematic of linkable devices in a wireless network according to other example embodiments.

Referring to FIG. 5, in addition to the components shown in FIG. 1 and described above, the network may include a controller 13, having a processor 13_a_ and a memory 13_b_.

The controller 13 is connected to the first access point 12 via connection 13_c_. The connection 13_c_ may be an Ethernet connection, however, example embodiments are not limited thereto and the connection 13_c_ may be any type of connection that allows data to be passed between the controller 13 and the first access point 12. The may be connected to any number of access points or nodes in a network.

The memory 13_b_ contains a pool of virtual addresses. When the first access point 12 connects with a client device 16 for the first time, the controller 13 may assign a virtual address to identify the first access point 12 to the client device 16, from the pool of virtual addresses contained in the memory 13_b_. The controller 13 records the assignment of the virtual address from the pool of virtual addresses in the memory 13_b_, and may prevent the virtual address from being assigned for use by any other access point in the network.

When the first access point 12 connects with a further client device (not shown), the controller 13 may assign a different virtual address to the first access point 12, so that it can use the different virtual address to identify itself to the further client device. The controller 13 may assign the different virtual address to the first access point 12 from the remaining pool of virtual addresses in the memory 13_b_. The assignment of the different virtual address is recorded by the controller 13, which may prevent the different virtual address from being assigned for use by any other access point in the network.

When the first access point 12 decouples with a client device, such as the client device 16 shown at FIG. 5, the virtual address that was assigned to the first access point 12 to identify itself to the client device 16 may no longer be required. Accordingly, the controller 13 may return the virtual address to the pool of available virtual addresses stored in the memory 13_b_. This is recorded and managed by the controller 13. Decoupling of a client device with an access point occurs when a message is received at the controller 13 that the access point no longer associates with the client device. In further examples, decoupling of a client device with an access point occurs when the connection between the client device and the access point times out. This occurs when communication between the client device and access point has not occurred for a determined (or, alternatively, a predetermined) amount of time.

Similarly, when the second access point 14 decouples with a client device, such as the client device 16 shown at FIG. 5, the virtual address that was assigned to the second access point 14 to identify itself to the client device 16 is no longer required. Accordingly, the controller 13 may return the virtual address to the pool of available virtual address stored in the memory 13_b_. Hence, FIG. 5 shows a centralised system for controlling the assignment and reuse of virtual addresses. This contrasts with the distributed architecture of FIG. 1, where the assignment and reuse of virtual addresses is controlled at the individual access points.

In a handoff operation between the first access point 12 and the second access point 14, the virtual address that was sourced from the controller 13 is passed between the first access point 12 and the second access point 14. The event is transmitted throughout the network 10, so that other nodes are aware that the virtual address is in use and are aware which node is using the virtual address. This information is transmitted in particular to the controller 13, so that an updated table of available virtual addresses is maintained in its memory 13_b_.

In some example embodiments, the controller 13 forms an integral part of the first access point 12, which is a master node. In other example embodiments, the controller 13 is a separate, stand-alone device.

In an example, the controller 13 is responsible for determining route discovery for a client destination, as described with reference to FIG. 3. The controller 13 determines that the first access point 12 is initially in communication with the client device 16, identifying itself to the client device 16 using a virtual address. The controller 13 uses a request/response mechanism to determine traffic through different pathways in a mesh network. A request, such as a Beacon Request Frame, is sent by the controller 13 to the client device 16 and to other nodes in the network, for example, the first and second access points 12, 14 of FIG. 1. The first and second access points 12, 14 also transmit requests to other nodes in the network. Each node in the network collects request frames and prepares and sends responses (such as Beacon Response Frames) to each of the request frames, containing information about the received request packets and corresponding data. This way, data, such as Received Signal Strength Indication (RSSI) values between different nodes are disseminated throughout the network, enabling determination of data throughputs in the network.

Once the controller 13 has received information from the route discovery process, the processor 13 of the controller 13 may perform operation S74, whereby potential mesh routes in the mesh network are evaluated. In some example embodiments, the controller 13 may evaluate the end-to-end throughput through alternative mesh routes in the network. For example, the controller 13 may determine traffic throughput to and from the client device 16 via each of the first access point 12 and the second access point 14.

In operation S76, the controller 13 may determine if the last hop formed by a floating link from the current access point is the best route that can be established.

In operation S78 no action is taken, if in operation S76, the controller 13 determines that the current route is the best route, (for example, if the connection between the first access point 12 and the client device 16 enables better data transfer than between the client device 16 and the second access point 14).

In operation S80, the controller 13 performs a handoff operation to transfer information relating to the virtual address upon which the current floating link is based to the access point that does form the best last hop, i.e. the second access point 14, if in operation S76 the controller 13 determines that the current route is not the best route (for example, if the connection between the first access point 12 and the client device 16 enables less data transfer than between the client device 16 and the second access point 14).

In some example embodiments, the controller 13 may periodically perform operations S70 to S80. However, in other example embodiments, operation S70 may be initiated by other means, such as receipt at an access point of a packet with a MAC address that is not registered in a forwarding table of MAC addresses that is stored in the memory of the access point.

In some example embodiments, the controller 13 may attempt to provide a client device with the strongest link to an access point. For example, in operation S76, the controller 13 may determine that the best route on the last hop is determined by the Received Signal Strength Indication (RSSI) at the other access points in the network. This is done by having each access point periodically broadcast a control packet to other associated mesh access points with a list of client devices it can hear and their RSSIs. This RSSI estimation can be done by an AP to which the client is not currently associated by observing the RSSI of broadcast packets, such as Probe Requests or Clear-To-Send (CTS) messages. This distinction is important to offset the possibly misleading effects of access point-client specific measures, such as beamforming. The RSSI is used to estimate potential link capacity between the estimating AP and client. While raw RSSI can be used directly to estimate this capacity, other factors, such as channel width (20/40/80/160 MHz), noise level, number of available transmit and receive chains etc. can be used to form a more accurate estimate of potential link capacity.

While FIG. 1 illustrates the first and second access points 12, 14, example embodiments are not limited thereto. For example, there may be any number of access points. Further, the decision to perform a handoff operation may be based on the end-to-end capacity of a connection including a wireless network device (such as an access point) and a client device versus the end-to-end capacity of a connection including a different wireless network device (such as a different access point) and the client device FIG. 6 is a home network 100 according to example embodiments.

Figure 6:
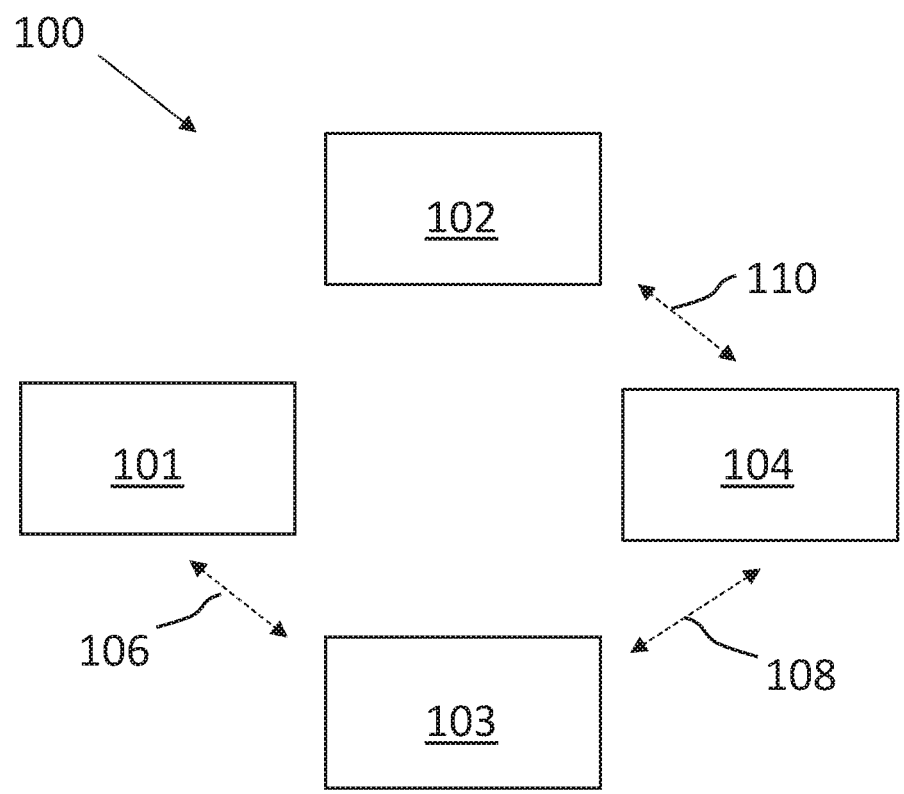
FIG. 6 is schematic of linkable devices in a wireless network, in accordance with an example embodiment.

Referring to FIG. 6, the home network may include a residential gateway 101, satellite or DVB set-top box 102, access point 103 and a WiFi connected tablet 104. Each of the residential gateway 101, satellite or DVB set-top box 102 and access point 103 may be WiFi access points connected to each other via a mesh network. The WiFi connected tablet 104 can connect with any of the access points 101, 102, 103. Accordingly, as the WiFi tablet 104 is moved around the home network 100, the access point 101, 102, 103 with which it associates is chosen in accordance with the process described in relation to FIGS. 1 to 3 above. For example, the WiFi tablet 104 may initially communicate with the residential gateway 101 via the access point 103 and communication links 106, 108. However, upon determination that there is a superior pathway directly between the tablet 104 and the residential gateway 101, the vMAC address used by the access point 103 may be handed off to the residential gateway 101 so that the residential gateway 101 can communicate using the vMAC to identify itself to the tablet 104, without the tablet 104 becoming aware that the access point has changed. Similarly, the WiFi tablet may be in communication with the satellite set top box 102, however, a superior pathway may exist between the access point 103 and the set top box 102, therefore the set top box 102 may pass its vMAC to the access point 103.

What is claimed is:

1. A controller for use in a network, the controller configurable for communication with an access point and a client device, the controller comprising:
   a memory configured to store a pool of available virtual addresses therein;
   at least one network interface; and
   a processor configured to,
      assign at least one virtual address from the pool of available virtual addresses to the access point as an assigned virtual address to enable the access point to identify itself to the client device and associate with the client device using the assigned virtual address,
      prevent the at least one virtual address from the pool of available virtual addresses from being assigned for use by any other access point in the network when the access point and the client device are associated using the at least one virtual address, in response to assigning the at least one virtual address from the pool of available virtual addresses to the access point,
      evaluate an end-to-end throughput of alternative routes between the client device and access points in the network in order to determine a desired end-to-end route,
      determine whether an end-to-end throughput of a current link between the access point and the client device using the at least one virtual address is greater than the end-to-end throughput of the alternative routes, and
      perform a phased handoff operation to transfer information relating to the at least one virtual address to another access point associated with one of the alternative routes in response to determining that the end-to-end throughput of the current link is worse than the end-to-end throughput of the alternative routes, the phased handoff operation including,
  transmitting, via at least one network interface of the access point, a command to the other access point to set, after a time period based on a number of queued packets at the access point that are queued for transmission to the client device, at least one network interface of the other access point to be addressable via the at least one virtual address whilst continuing to transmit the number of queued packets that are queued for transmission to the client device,
  determining that the other access point has notified the network that the other access point will be using the at least one virtual address to communicate with the client device after the time period,
  disassociating the at least one network interface of the access point and the at least one virtual address after the time period, and
  transmitting, via the at least one network interface of the access point, a notification to the other access point after the number of queued packets has been depleted, the notification causing the other access point to start transmitting queued data packets to the client device using the at least one virtual address.

2. The controller according to claim 1, wherein the controller is further configured to return the at least one virtual address to the pool of available virtual addresses upon receipt of a message indicating that the access point and the client device have decoupled.

3. The controller according to claim 1, wherein the controller is configured to perform a route discovery protocol for a client destination.

4. The controller according to claim 1, wherein the at least one virtual address is a reused virtual address that has previously been assigned to an access point and returned to the pool of available virtual addresses.

5. The controller according to claim 3, wherein the controller is configured to initiate the route discovery protocol in response to the access point receiving a packet with a MAC address that is not registered in a forwarding table of MAC addresses stored in a memory of the access point.

6. The controller according to claim 1, wherein the controller is configured to use a response/request mechanism to determine traffic through different pathways in the network.

7. The controller according to claim 1, wherein the controller is integrated in the access point.

8. A method of managing virtual addresses in a network including an access point and a client device, the method comprising:
  assigning at least one virtual address from a pool of available virtual addresses to the access point as an assigned virtual address to enable the access point to identify itself to the client device and associate with the client device using the assigned virtual address,
  preventing the at least one virtual address from the pool of available virtual addresses from being assigned for use by any other access point in the network when the access point and the client device are associated using the at least one virtual address, in response to assigning the at least one virtual address from the pool of available virtual addresses to the access point,
  evaluating an end-to-end throughput of alternative routes between the client device and access points in the network in order to determine a desired end-to-end route,
  determining whether an end-to-end throughput of a current link between the access point and the client device using the at least one virtual address is greater than the end-to-end throughput of the alternative routes,
  performing a phased handoff operation to transfer information relating to the at least one virtual address to another access point one of the alternative routes in response to determining that the end-to-end throughput of the current link is worse than the end-to-end throughput of the alternative routes, the phased handoff operation including,
    transmitting, via at least one network interface of the access point, a command to the other access point to set, after a time period based on a number of queued packets at the access point that are queued for transmission to the client device, at least one network interface of the other access point to be addressable via the at least one virtual address whilst continuing to transmit the number of queued packets that are queued for transmission to the client device,
    determining that the other access point has notified the network that the other access point will be using the at least one virtual address to communicate with the client device after the time period,
    disassociating the at least one network interface of the access point and the at least one virtual address after the time period, and
    transmitting, via the at least one network interface of the access point, a notification to the other access point after the number of queued packets has been depleted, the notification causing the other access point to start transmitting queued data packets to the client device using the at least one virtual address.

9. The method according to claim 8, further comprising:
  returning the at least one virtual address to the pool of available virtual addresses upon receipt of a message indicating that the access point and the client device have decoupled.

10. The method according to claim 8, further comprising:
  performing a route discovery protocol for a client destination.

11. The method according to claim 10, further comprising:
  initiating the route discovery protocol in response to the access point receiving a packet with a MAC address that is not registered in a forwarding table of MAC addresses that is stored in a memory of the access point.

12. The method according to claim 8, further comprising:
  determining, using a response/request mechanism, traffic through different pathways in the network.

13. The method according to claim 8, wherein the access point includes a controller configured to perform the method of claim 8.

14. A system comprising:
  an access point;
  a client device; and
  a controller, the controller including,
    a memory configured to store a pool of available virtual addresses therein,
    at least one network interface, and
    a processor configured to,
      assign at least one virtual address from the pool of available virtual addresses to the access point in a network as an assigned virtual address to enable the access point to identify itself to the client device and associate with the client device using the assigned virtual address, prevent the at least one virtual address from the pool of available virtual addresses from being assigned for use by any other access point in the network when the access point and the client device are associated using the at least one virtual address, in response to assigning the at least one virtual address from the pool of available virtual addresses to the access point, evaluate an end-to-end throughput of alternative routes between the client device and access points in the network in order to determine a desired end-to-end route, determine whether an end-to-end throughput of a current link between the access point and the client device using the at least one virtual address is greater than the end-to-end throughput of the alternative routes, and perform a phased handoff operation to transfer information relating to the at least one virtual address to another access point associated with one of the alternative routes in response to determining that the end-to-end throughput of the current link is worse than the end-to-end throughput of the alternative routes, the phased handoff operation including, transmitting, via at least one network interface of the access point, a command to the other access point to set, after a time period based on a number of queued packets at the access point that are queued for transmission to the client device, at least one network interface of the other access point to be addressable via the at least one virtual address whilst continuing to transmit the number of queued packets that are queued for transmission to the client device, determining that the other access point has notified the network that the other access point will be using the at least one virtual address to communicate with the client device after the time period, disassociating the at least one network interface of the access point and the at least one virtual address after the time period, and transmitting, via the at least one network interface of the access point, a notification to the other access point after the number of queued packets has been depleted, the notification causing the other access point to start transmitting queued data packets to the client device using the at least one virtual address.

* * * * *